(12) United States Patent
Chazallet et al.

(10) Patent No.: US 6,275,339 B1
(45) Date of Patent: Aug. 14, 2001

(54) EDGE-LIGHTED LUMINOUS DEVICE

(76) Inventors: Frédéric Chazallet, 146, chemin de Palama, 13013 Marseille; Christophe E. Blanc, Le Flammarion, Route d'Ansouis, 84120 Pertuis, both of (FR)

(*) Notice: Subject to any disclaimer, the term of this patent is extended or adjusted under 35 U.S.C. 154(b) by 0 days.

(21) Appl. No.: 09/276,995

(22) Filed: Mar. 26, 1999

(30) Foreign Application Priority Data

Mar. 25, 1998 (FR) .................................................. 98 03933

(51) Int. Cl.$^7$ ................. G02B 5/02; F21V 8/00; G02F 1/1335
(52) U.S. Cl. .............. 359/599; 359/707; 349/62; 349/64; 362/31
(58) Field of Search ............ 359/599, 15, 707; 349/59–67; 362/31

(56) References Cited

U.S. PATENT DOCUMENTS

| | | | |
|---|---|---|---|
| 4,989,933 | * 2/1991 | Duguay | 359/599 |
| 5,461,547 | * 10/1995 | Ciupke et al. | 349/64 |
| 5,477,422 | * 12/1995 | Hooker et al. | 349/62 |
| 5,584,556 | * 12/1996 | Yokoyama et al. | 349/62 |
| 5,587,816 | * 12/1996 | Gunjima et al. | 349/62 |
| 5,664,862 | * 9/1997 | Redmond et al. | 362/31 |
| 5,926,601 | * 7/1999 | Tai et al. | 349/64 |

FOREIGN PATENT DOCUMENTS

| | | |
|---|---|---|
| 0495273 | 7/1992 | (EP) . |
| 0800036 | 10/1997 | (EP) . |
| 9205535 | 4/1992 | (WO) . |
| 9636892 | 11/1996 | (WO) . |

* cited by examiner

Primary Examiner—Thong Nguyen
(74) Attorney, Agent, or Firm—Ladas & Parry

(57) ABSTRACT

The technical field of the invention is that of manufacturing luminous display devices. The invention provides an edge-lighted luminous device comprising a thin plate of translucent or transparent plastics material, a light source lighting the edge of the plate, and on at least one of the main faces of the device, a grating of linear diffusing motifs of spacing that varies regularly.

16 Claims, 4 Drawing Sheets

EDGE-LIGHTED LUMINOUS DEVICE

The present invention relates to an edge-lighted luminous device.

The technical field of the invention is the field of manufacturing luminous display devices.

BACKGROUND OF THE INVENTION

It is known that luminous display devices such as signs having symbols and/or graphics elements such as images can be made out of a thin support or substrate which may be plane, such as a sheet or a panel of translucent or transparent material, and which is lighted via the edge of the support by means of a light source such as a fluorescent tube; one of the main faces of the support may have zones of shapes that correspond to symbols (digits or letters in particular) which are etched or frosted by sand-blasting so as to appear brighter than the remainder of the main face of the support.

The problem encountered in that type of device is the problem of non-uniform lighting: zones far away from the light source are darker; it also often happens that shadows can be seen that the frosted zones cast into other zones of the support.

Pat. No. EP 549 679 describes a sign comprising a light-transmitting sheet which is side-lighted and which has two opposite faces each having dots applied thereto; according to that document, in order to obtain regular lighting of the sign, the dots are etched, painted, or printed, and form a matrix substantially covering the two main surfaces of the sheet; nevertheless, it has been observed that that technique does not provide entire satisfaction.

OBJECTS AND SUMMARY OF THE INVENTION

An object of the present invention is to provide an edge-lighted luminous device which is improved, and also a method of manufacturing such a device.

The solution to the problem posed consists in providing, on at least one of the two main opposite faces of the light-transmitting support (such as a sheet or plate of translucent or transparent plastics material), a grating of linear diffusing motifs, i.e. motifs that are elongate along a straight or curved line, and with spacing that varies regularly in geometric progression.

In another aspect, the invention consists in proposing a light guide for a lighting device, the light guide comprising (or being constituted by) a transparent (plane or curved) plate of glass or plastics material having two opposite main faces and an edge, at least one of the main faces including a grating of linear diffusing motifs (to enable said main face to emit light conveyed by the plate); the spacing of the linear diffusing motifs varying regularly along an axis in geometric progression having a ratio situated in the range 0.99 to 1.01.

The diffusing nature of the motifs results from the outside face of the support being deformed locally either to be in relief or preferably to be recessed; because this deformation extends uniformly and identically all along the linear motif, light travelling inside the support is caused to be diffused and/or extracted in a manner which is uniform all along the linear motif; because the linear motifs are spaced apart by a distance that varies regularly (i.e. that increases or decreases regularly) along an axis passing through the light source and/or perpendicular to the edge of the support, diffusion is obtained which is uniform over the entire zone of the support that contains the linear diffusing motifs.

In a preferred embodiment, the linear diffusing motifs are constituted by segments which may be curvilinear but which are preferably rectilinear, which motifs are etched and/or recessed, i.e. they constitute grooves; the various linear motifs or grooves are preferably identical in width, and the spacing between the linear motifs varies in geometric progression having a ratio of the order of 0.99 to 1.01, and preferably of the order of 0.999 to 1.001, and in particular of the order of 0.9999 to 1.0001, but not equal to 1.

The spacing of the motifs increases on coming closer to the edge via which light is injected into the support; the invention makes it possible to obtain brightness that is substantially constant over all of the zone of the substrate that is provided with linear diffusing motifs; this zone can consist in and/or extend over a substantial portion of the main face, e.g. over all of at least one of the two opposite main faces, so that luminosity is uniform over the entire face; under such circumstances, for the purpose of making a sign, the symbols to be displayed are written either on the face of the support that carries the linear diffusing motifs, or else on a separate medium, such as a sheet of paper, which is pressed against the face of the support provided with the linear diffusing motifs; alternatively, the linear motifs are disposed regularly in a zone whose (outer or inner) outline corresponds to the shape of the symbol or drawing to be displayed; in which case, the ends of the segments of the linear diffusing motifs are situated on said outline forming the envelope of the symbol.

When the support is lit via one edge only, the spacing of the motifs varies monotonically, decreasing going away from said edge; when the support is lit via two opposite edges thereof, the spacing of the diffusing motifs varies in non-monotonic manner: decreasing going away from a first edge towards a central zone of the support, and then increasing going away from said central zone towards a second lighting edge opposite said first lighting edge.

BRIEF DESCRIPTION OF THE DRAWINGS

The advantages provided by the invention will be better understood from the following description which refers to the accompanying drawings which show preferred embodiments of the invention without limiting the invention thereto in any way.

In the drawings, elements which are identical or similar are given the same references from one figure to another, unless stated to the contrary.

DETAILED DESCRIPTION

Figure 1:
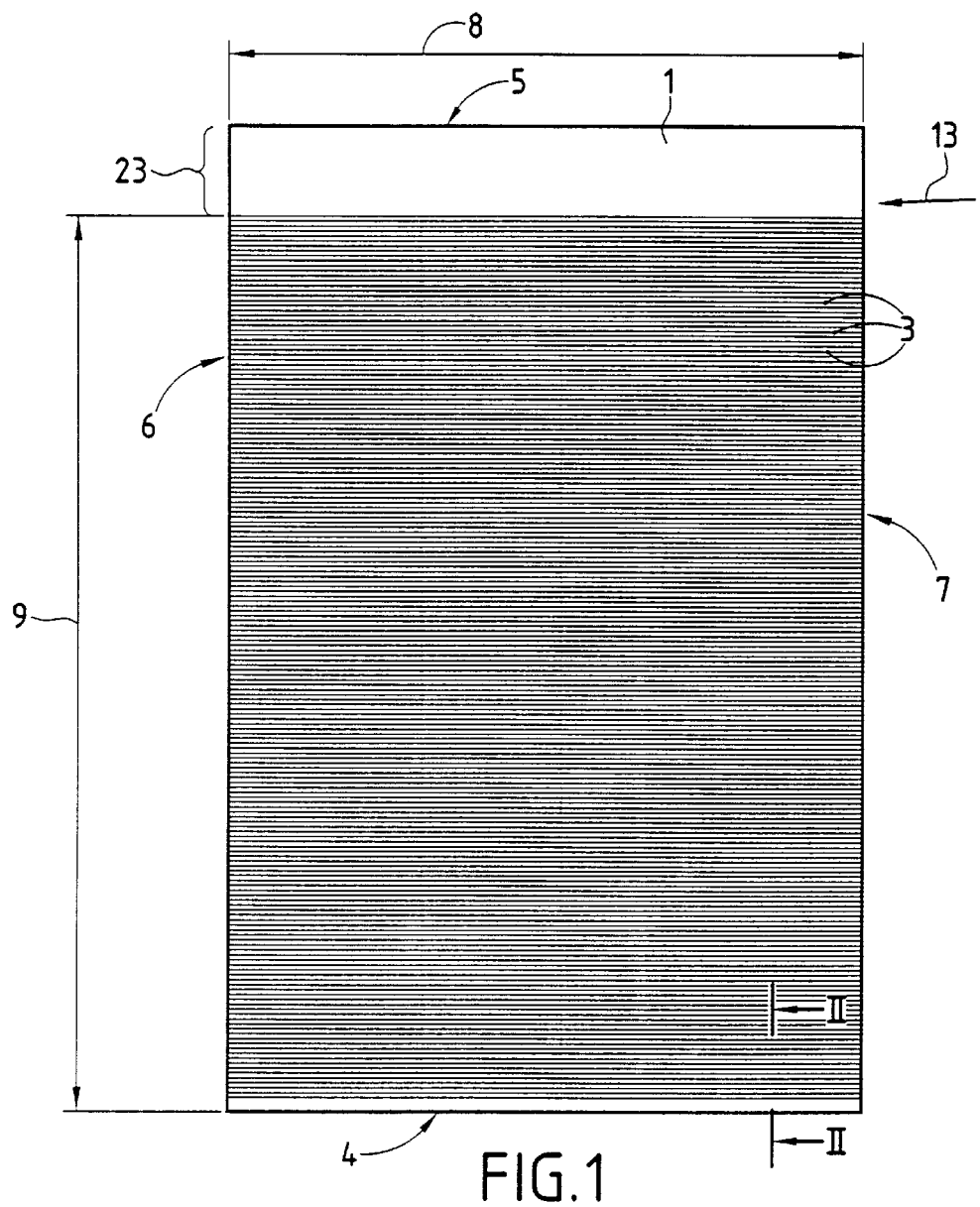
FIG. 1 is a plan view of a first embodiment of a thin support of a luminous device in accordance with the invention.
Figure 2:
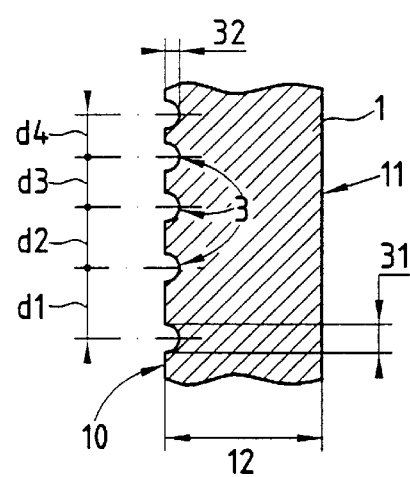
FIG. 2 is a view on II—II of FIG. 1 and shows the thin support in fragmentary cross-section.
Figure 3:
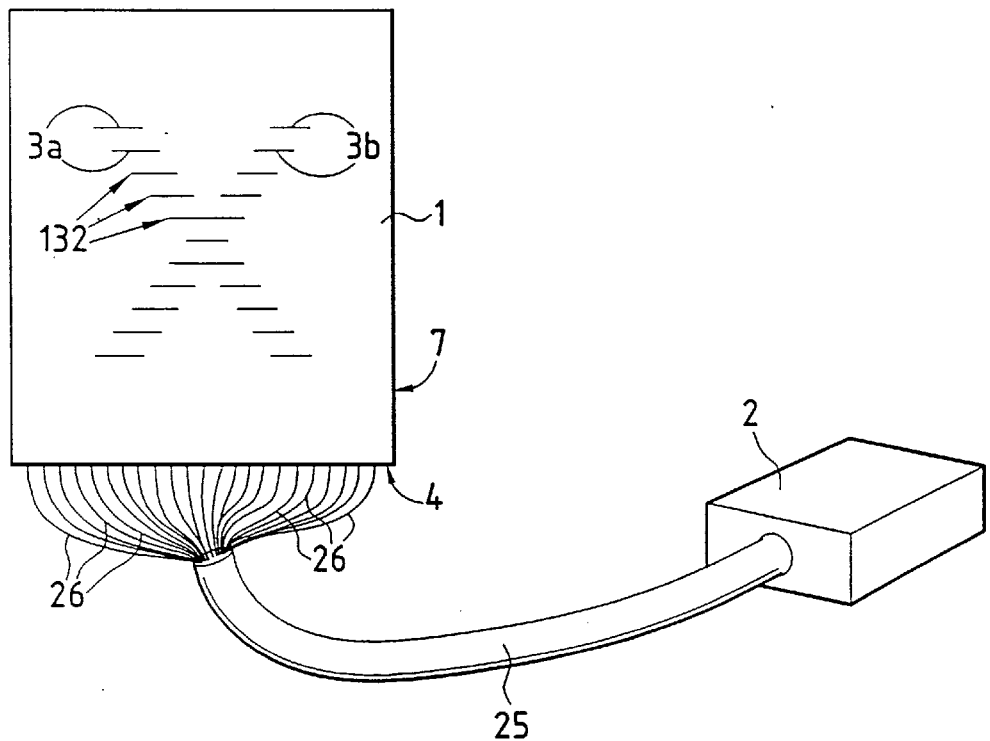
FIG. 3 is a diagrammatic perspective view showing a second embodiment of a device of the invention.

With reference to FIGS. 1 to 3 in particular, the luminous device in accordance with the invention comprises a light source 2 delivering light flux carried by a cable 25 made up of a plurality of lengths 26 of optical fiber whose ends are disposed in regular manner along the edge 4 (FIG. 3) of a support 1 such as a thin panel or sheet of transparent plastics material, in particular made of polycarbonate or of polymethylmethacrylate.

The light source 2 may comprise one or more halogen lamps or low pressure metal vapor lamps, where the latter in particular provide high efficiency and large amounts of luminance. The coupling between the bulb(s) and the bundle of optical fibers makes use mainly of reflectors and does not use condenser lens systems. This makes it possible to achieve high coupling efficiency and also makes it possible to use dichroic reflectors for obtaining light that is cold.

The rectangular sheet 1 has two opposite main faces 10 and 11 and it is defined by four edges or sides 4, 5, 6, and 7 that are perpendicular in pairs.

On the face 10 of the support 1 which is of thickness 12, there are etched a plurality of linear diffusing motifs constituted by grooves 3 of spacing d1, d2, d3, and d4 that varies regularly along a perpendicular to the edges 4 and 5.

Because this spacing varies in geometric progression, the ratios of any two successive spacings d1/d2, d2/d3, d3/d4, . . . are equal to the ratio of the geometric progression and its value is close to 1, but not equal to 1.

In the embodiment shown in FIG. 2, the grooves 3 are substantially semicircular in profile, such that the depth 32 of the grooves is substantially equal to half the width 31 thereof.

Figure 4:
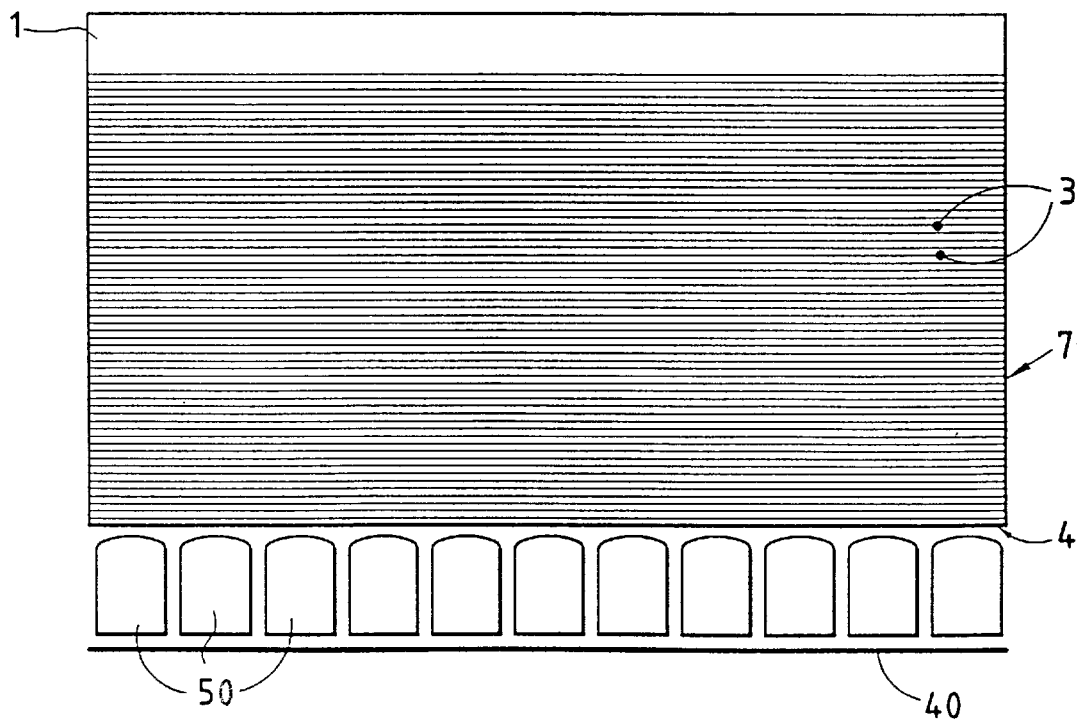
FIG. 4 is a diagrammatic plan view of a third embodiment of a support used in making a device of the invention.

By way of example, the regularly spaced-apart motifs 3 that are parallel to one another and to the opposite sides or edges 4 and 5 have been etched on a polycarbonate support 1 of thickness 12 that is close to 1 mm, of width 8 that is close to 400 mm, and of etched length 9 that is close to 800 mm; since the largest spacing (d1, FIG. 2) is 1.5 mm, 1600 lines are drawn, with spacing that varies in geometric progression (at a ratio of 0.999 starting from the largest spacing, i.e. at a ratio of 1.001 starting from the smallest spacing). As shown in FIG. 4 the sheet 1 is fitted with a row of LEDs 50 on support 40 to distribute incident light.

As shown in FIG. 4 the shaft 1 is fitted with a row of LEDs 41 on support 40 to distribute incident light.

Figure 5:
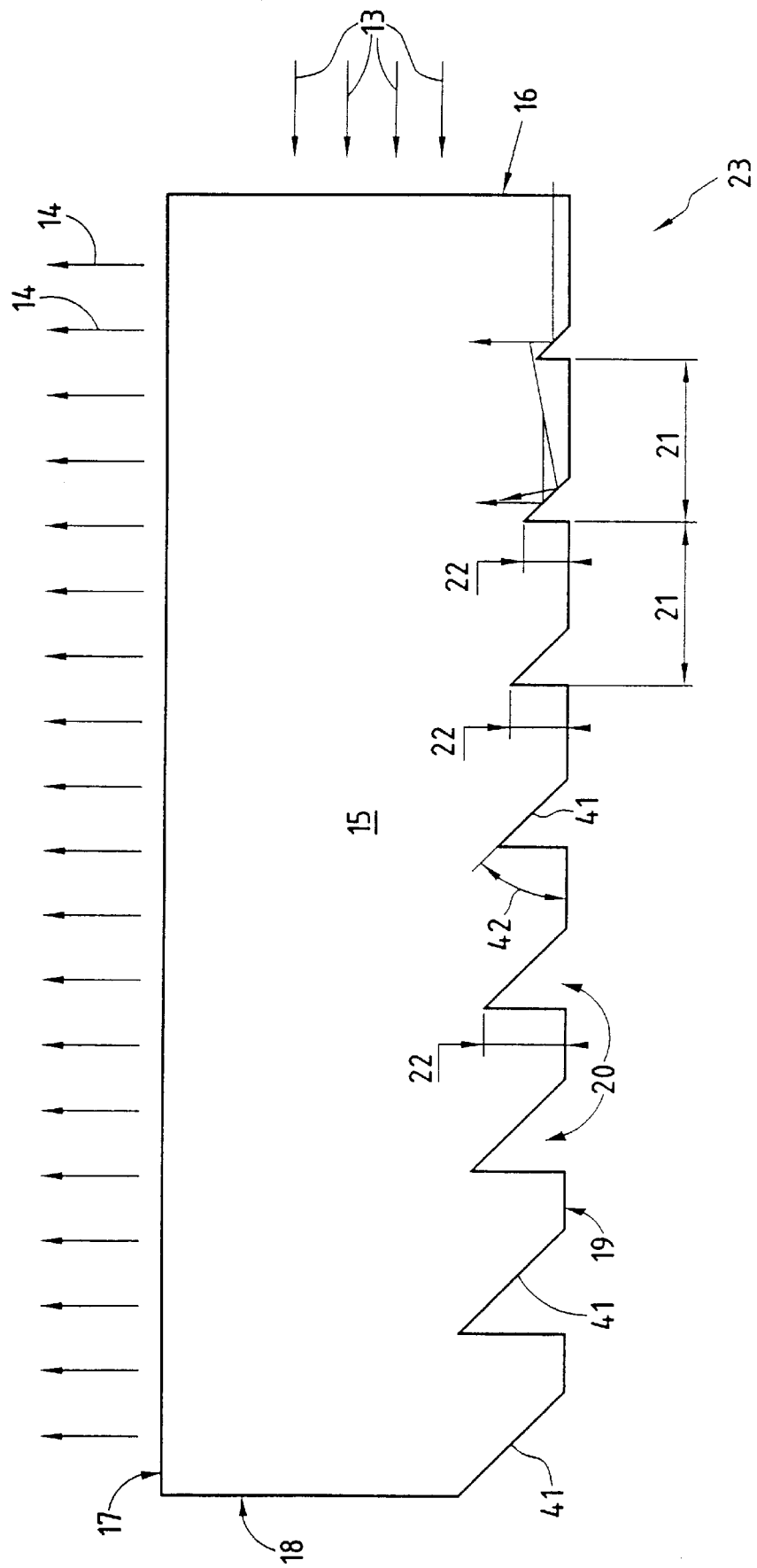
FIG. 5 is a plan view of a device for deflecting a light beam to produce a uniform beam along the edge of a thin support.
Figure 7:
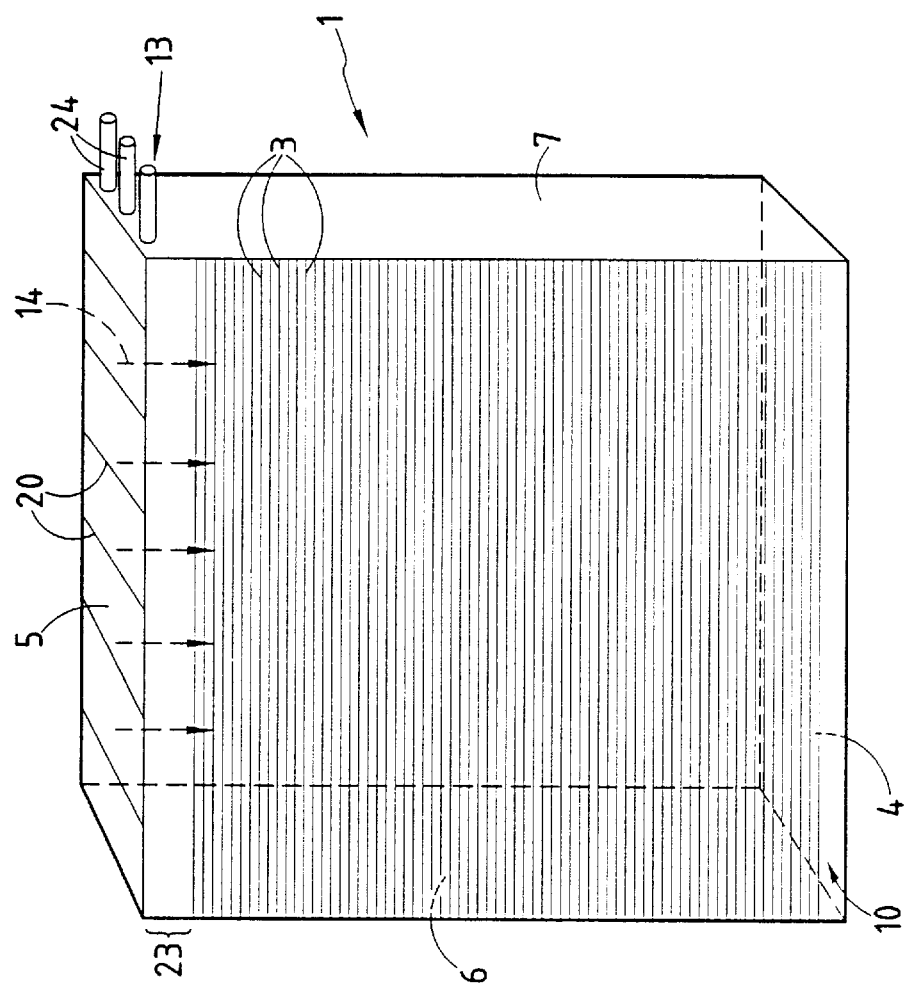
FIG. 7 is a diagrammatic perspective view of a support 1 in an embodiment similar to that of FIG. 1.

As shown in FIGS. 1, 5, and 7 in particular, the support 1 may have a deflector zone 23 serving to distribute incident light flux 13 that arrives substantially parallel to the edge 5 and/or to the motifs 3 so as to form a deflected light beam 14 that is substantially uniform all along the edge 5 and perpendicular thereto; the deflector device 23 can be integrated in the support 1 or it can be separate, as shown in FIG. 5 where it is in the form a thin rectangular parallelepiped 15 of thickness that is preferably close to the thickness of the panel 1 with which it is to be associated, and defined by four faces or edges 16, 17, 18, and 19; the incident light 13 (which is delivered via the ends 24 of the optical fibers, see FIG. 7) penetrates via the face 16 and leaves via the face 17 in the form of a uniform beam 14 distributed over the entire length of said face 17 which is placed adjacent to the edge 4 or 5 of the support 1 with which it is associated; the face 19 opposite the face 17 is provided with a plurality of grooves 20 of triangular profile that are spaced apart at a pitch 21, e.g. a varying pitch, and of a depth 22 that is constant, for example; nevertheless, in the preferred embodiment as shown in FIG. 5, the pitch 21 at which the notches 20 are spaced apart is constant and it is the depth 22 of the notches or grooves that varies regularly along the side (or edge) 19, with depth increasing on going away form the light injection zone 16, thereby enhancing the production of a light beam 14 of intensity that is substantially constant along the side (or edge) 17; the faces 18 and 19 and the grooves 20 are preferably provided on the outside with reflective treatment or means to improve deflection of the incident beam 13 for forming the reflected beam 14; each groove 20 has a substantially plane face 41 which is inclined at an angle 42—substantially equal to 450—relative to the edge 19 of the deflector 23 so as to act as a diffusing mirror to form the outlet flux 14 by reflecting the inlet flux 13.

The deflector device 23 can be constituted by a piece 15 of material that is identical to the material constituting the panel 1, e.g. about 45 mm wide, and provided with notches of depth 22 which is about 8 mm and which are spaced apart by a distance 21 that is about 25 mm; this makes it possible in a small amount of space to deflect the incident beam 13 and avoid forming a structure constituted by the ends of the optical fiber lengths 26 projecting from the edge 4 of the support 1, as shown in FIG. 3, since such a structure is bulky and requires protection.

Whereas the motifs 3 in the embodiments shown in FIGS. 1, 4, and 7 in particular, extend continuously over the entire length of the support 1, in the embodiment of FIG. 3, the linear motifs 3 are groove segments 3a, 3b; the grooves are parallel to the edge 4 through which light is injected; the positions and the lengths of the segments are such that the ends 132 of the segments draw a letter "X".

Figure 6:
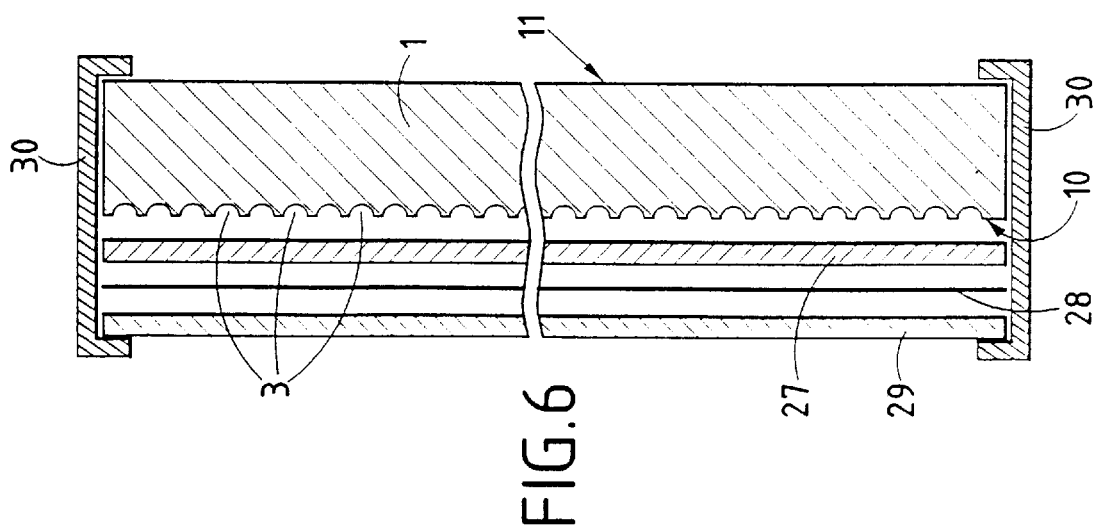
FIG. 6 is a longitudinal section view on a plane perpendicular to the plane of the support showing another embodiment of a luminous device of the invention.

In the embodiment shown in FIG. 6, the support 1 with the diffusing motifs 3 on its face 10 is housed in a frame 30, e.g. constituted by channel-section bars; against (in front of) the face 10, there are disposed a plurality of thin elements partially covering at least the face 10: a uniform diffusing screen 27, a mask 28 such as a sheet of paper or adhesive carrying the symbols to be displayed, and a protective panel 29; these elements are held next to one another on the support 1 by the frame 30.

The invention is particularly applicable to making luminous signs or boxes, luminous slabs or panels for buildings, and backlighting for computer screens.

According to other preferred characteristics of the invention:

the width of each groove or linear diffusing motif is of the order of 1 micron ($\mu$m) to 100 $\mu$m, preferably of the order of 10 $\mu$m to 80 $\mu$m, e.g. close to 20 $\mu$m to 50 $\mu$m;

the minimum distance between the two closest-together grooves (which are thus the furthest away from the edge through which light is inserted) is of the order of 2 $\mu$m to 200 $\mu$m, in particular of the order of 20 $\mu$m to 160 $\mu$m, e.g. close to 40 $\mu$m to 100 $\mu$m;

the maximum distance between the two furthest-apart grooves (which are thus the closest to the edge and/or to the light source) is less than or equal to 10 mm, in particular less than or equal to 5 mm;

the number of linear diffusing motifs lies in the range 100 to 10,000, preferably in the range 300 to 3000, e.g. close to 600 to 1500; and the linear diffusing motifs may be constituted by interrupted grooves forming parallel rectilinear segments of various lengths which are grouped together so that the envelope constituted by their ends forms a drawing or a symbol which appears bright; alternatively, the grooves are uninterrupted and the symbols are formed on a mask placed against the substrate or support.

The luminous display device preferably has a plurality of lengths of plastic optical fiber constituting a bundle that carries light from the light source to the support; this makes it possible to place the light source at a distance from the support; this makes it easy to obtain a device that is robust, insensitive to water, in particular for use on the outside of a building, and that presents no risk of electric shock to the public; this also makes it easier to inject light beams of different wavelengths and of thus of different colors via the edge of the support.

The device may include a light deflector or distributor member extending along an edge or side of the support and including reflector means so as to produce all along the edge light flux that is uniform and directed substantially perpendicularly to the edge, starting from incident light flux that is directed substantially parallel to the edge; this distributor can be integral with the support; in which case the support can be provided with reflecting grooves in said edge having longitudinal axes that are substantially perpendicular to the plane of the support, with the spacing thereof varying, e.g. regularly, along the edge, and with the depth thereof being constant or varying regularly; each groove has a face that is perpendicular to the plane of the diffusing support and that extends at an angle close to 45° relative to the edge via which light is injected into the support, which face acts as a mirror; the face may be plane or slightly concave to enhance light dispersion.

Alternatively, the device may have a plurality of light-emitting diodes (LEDs) placed facing and/or along the edge; the use of LEDs is advantageous since they can be powered at low voltage, thereby reducing any risk of accident by contact; LEDs are also robust, reliable, and of low cost; they are housed at least in part in the support, or else they are disposed substantially in contact with one of its edges, as shown in FIG. 4; the device may also have a uniform thin plane diffusing screen.

According to another aspect, the invention consists in manufacturing an edge-lighted luminous device by machining linear diffusing motifs of regularly varying spacing by means of a laser beam.

To this end, the support to be machined can be mounted on X-Y displacement means for moving it along two perpendicular axes; alternatively, the laser source (or indeed a member such as a mirror for guiding the beam it emits) can itself be mounted on an X-Y displacement device, with displacements being controlled by a digital electronic unit under the control of software enabling. diffusing motifs to be made in a predetermined geometrical configuration; the machining of plastics materials by laser makes it simple to form rectilinear or curved linear diffusing grooves of spacing that varies regularly, and it can optionally be adapted to shaping symbols for marks to be displayed in very simple manner.

By way of example, it is possible to use a copper vapor laser source or a $CO_2$ laser; it is preferable to choose a laser whose wavelength is of the order of 1 $\mu$m to 10 $\mu$m, in particular a $CO_2$ laser having a wavelength close to 10.6 $\mu$m. It is also possible to provide heat treatment (or "annealing") for the support to adjust the diffusion factor of motifs that have already been formed in the support, and/or to provide mechanical and/or thermal deformation of the support after the diffusing motifs have been machined, in order to obtain a plate that is curved.

The transparent material constituting the support plate is preferably selected from glass, polycarbonate, and polymethylmethacrylate; it is preferable to choose a material whose transmission coefficient in the visible range is at least 0.85, and in particular lies in a range 0.85 to 0.95, thereby ensuring good light diffusion within the plate and ensuring uniform diffusion of light out from the plate through any surface of the plate which is provided with diffusing motifs.

It has been observed that the light diffusion performance of a plate of the invention is considerably improved, in particular for plates of large size such as rectangular plates that are at least 0.1 meters (m) wide, in particular having a width of not less than 0.25 m, and a length of not less than 0.25 m, in particular a length of not less than 0.5 m; tests performed on rectangular plates of area lying in the range 0.1 $m^2$ to 2 $m^2$ and of thickness lying in the range 1 mm to 10 mm, and in particular in the range 2 mm to 7 mm, have shown that diffusion is uniform over the entire machined area.

The use of a laser beam deflected by a guide member that moves under the control of a computer fitted with (program) means for calculating the positions and the spacing of the diffusing motifs (in particular as a function of the dimensions of a plate to be machined), make it easy to machine plates of different dimensions and/or with different light diffusion characteristics, and make it possible to manufacture (custom-made) panels singly; in this preferred embodiment, the laser source and the plate to be machined are mounted so as to be fixed on a machine bed.

In addition, using a laser beam that is moved under the control of a computer makes it possible to machine the grid of diffusing motifs accurately and quickly.

The invention makes it possible to obtain luminous panels having a satisfactory angle of view, e.g. about 60°.

What is claimed is:

1. A light guide for a lighting device, said light guide comprising a transparent plate of glass or plastics material and having two opposite main faces and an edge, at least one of said main faces having a grating of linear diffusing motifs, said linear diffusing motifs being spaced from one another at a spacing which varies regularly along an axis in geometric progression having a ratio lying in the range 0.99 to 1.01 and not equal to 1.

2. A guide according to claim 1, wherein said ratio lies in the range 0.999 to 1.001 and not equal to 1.

3. A guide according to claim 1, wherein said plate has a transmission coefficient in a visible range which is situated in the range 0.85 to 0.95.

4. A guide according to claim 3, wherein the number of said diffusing motifs lies in the range of 300 to 3000.

5. A guide according to claim 4, wherein said motifs are in the form of rectilinear grooves that are parallel to one another and are parallel to said edge.

6. A guide according to claim 5, wherein said motifs have a width lying in the range of 1 micron to 100 microns.

7. A guide according to claim 3, wherein said motifs are formed by means of a laser beam.

8. A guide according to claim 1, wherein the number of said diffusing motifs lies in the range 300 to 3000.

9. A guide according to claim 1, wherein said motifs are formed by means of a laser beam.

10. A guide according to claim 1, wherein said motifs are in the form of rectilinear grooves that are parallel to one another and are parallel to said edge.

11. A guide according to claim 1, wherein said motifs have a width lying in the range of 1 micron to 100 microns.

12. A guide according to claim 1, wherein a minimum distance between two grooves lies in the range of 2 microns to 200 microns.

13. A guide according to claim 1, wherein a maximum distance between two grooves is less than 10 millimeters.

14. A luminous panel including:

a light guide, said light guide comprising a transparent plate of glass or plastics material and having two opposite main faces and an edge, at least one of said main faces having a grating of linear diffusing motifs, said linear diffusing motifs being spaced from one another at a spacing which varies regularly along an axis in geometric progression having a ratio lying in the range 0.99 to 1.01 but not equal to 1, and wherein said motifs are formed by means of a laser beam, said motifs being in the form of rectilinear grooves that are parallel to one another and are parallel to said edge, said motifs having a width lying in the range of 1 $\mu$m to 100$\mu$m, and in which a minimum distance between two grooves lies in the range of 2 $\mu$m to 200 $\mu$m, and in which a maximum distance between two grooves is less than 10 mm, a light source; and a bundle of plastic optical fibers transporting light emitted by said source to said edge of said plate.

15. A luminous panel according to claim 14, further including a light distributing member for distributing light along said edge, said member having reflecting means comprising grooves formed in an edge of said member, a longitudinal axis of each of said grooves being substantially perpendicular to said p late and depth of said grooves varying along said edge of said member, and wherein said distributing member is integrated in said plate.

16. A luminous panel according to claim 14, comprising a diffusing screen for diffusing light coming from said bundle of fibers.

* * * * *